United States Patent [19]

Smith

[11] 4,073,156
[45] Feb. 14, 1978

[54] METHOD AND APPARATUS FOR LAYING A SUBMERGIBLE ELONGATE STRUCTURE

[75] Inventor: Leif Franz Halvor Smith, Great Yarmouth, England

[73] Assignee: Brown & Root, Inc., Houston, Tex.

[21] Appl. No.: 720,641

[22] Filed: Sept. 7, 1976

[51] Int. Cl.² .............................................. F16L 1/00
[52] U.S. Cl. ........................................ 61/107; 61/111
[58] Field of Search ................ 61/108, 109, 107, 110, 61/111; 226/25; 254/172

[56] References Cited
U.S. PATENT DOCUMENTS

| 3,491,541 | 1/1970 | Berard | 61/108 |
| 3,775,987 | 12/1973 | Rochelle et al. | 61/108 |
| 3,911,689 | 10/1975 | Hogan | 61/108 |

Primary Examiner—Jacob Shapiro
Attorney, Agent, or Firm—Kenway & Jenney

[57] ABSTRACT

Disclosed are a method and apparatus for laying a submergible elongate structure upon the bed of a body of water. The last-assembled portion of the structure is supported upon a floating vessel having a deck which defines a path for movement of the structure relative to the deck, the path including an assembly region in which additional submergible elongate structure can be assembled from components. The structure is clamped downstream (relative to the path of movement) of the assembly region and then additional submergible elongate structure is assembled in that region and is secured to the previously existing structure. The free end of the additional structure is gripped with a connector that is connected, through a flexible cable under tension, to a winch. Then the clamping assembly is disengaged from the structure so that the winch alone maintains tension on the structure. The floating vessel is then moved along the laying route and simultaneously the flexible cable is payed out from the winch, thereby permitting the structure to move relative to the path along the deck of the vessel. After such movement for the length of the assembly region on the deck, the structure is again clamped with the clamping assembly downstream of the assembly region and the connector is disengaged from the free end of the submergible elongate structure, thereby permitting another cycle as just described.

9 Claims, 5 Drawing Figures

METHOD AND APPARATUS FOR LAYING A SUBMERGIBLE ELONGATE STRUCTURE

BACKGROUND OF THE INVENTION

This invention relates to a method and apparatus for laying a submergible elongate structure upon the bed of a body of water. More particularly, the invention involves the laying of a submergible pipeline.

The increased economic and strategic importance of offshore deposits of oil and natural gas has given rise to a variety of previously unfaced problems concerning the most economical and efficient means for transporting petroleum and/or natural gas between various locations in a producing offshore field. Pipeline arrangements, of course, have been the most common proposal to deal with various transportation situations and a number of pipeline laying techniques and apparatuses have been proposed. No one arrangement, however, is ideal for all situations. For example, the technique taught in Jones et al U.S. Pat. No. 3,688,878 is a very sophisticated and successful arrangement, but requires specialized equipment. In view of this, Rochelle et al. U.S. Pat. No. 3,775,987 proposes an alternative technique which involves somewhat less sophisticated and expensive equipment and the conversion of a conventional planar deck barge to a pipeline laying barge. These two United States patents are assigned to the assignee of the present application, as are the following United States patents, each of which discloses an effective method and apparatus for laying pipelines upon the bed of a body of water: Hauber et al. U.S. Pat. No. 3,280,571; Lawrence U.S. Pat. Nos. 3,390,532 and 3,487,648; Rochelle et al. U.S. Pat. No. 3,507,126; and Lochridge U.S. Pat. No. 3,606,759.

While the proposals of the above-mentioned United States patents are effective in the situations for which they are designed, the specialized equipment and degree of sophistication evident in those patents are an incentive to devise alternative techniques for laying relatively short lengths of in-field pipelines. This is particularly true where such short lenghts of in-field pipelines are of relatively small diameter such that substantial modification of the already sophisticated equipment taught in those techniques may be required. Furthermore, sound management of assets and resources may preclude the commitment of expensive and sophisticated equipment to a pipeline laying operation where a relatively short pipeline is all that must be laid.

Even when dealing with the laying of relatively short pipelines, however, it is highly desirable to have a system for laying pipeline which permits the relatively rapid laying of the pipeline in a manner which does not expose the pipeline being laid to the risk of damage during the laying operation. Any simplified pipeline laying apparatus and method directed to the particular problem of short, small diameter pipelines, therefore, still must meet reasonable standards of efficiency and pipeline handling capabilities.

OBJECTS AND SUMMARY OF THE INVENTION

In view of the foregoing discussion, it is a general object of the present invention to provide a method and apparatus for laying submergible elongate structures in an economical and efficient manner.

It is a particular object of the invention to provide a method and apparatus suitable for laying relatively short submerged pipeline without requiring the application of expensive and sophisticated equipment.

It is a further object of the present invention to provide a method and apparatus for laying submerged elongate structures which are easily adaptable to structures of virtually any diameter.

An apparatus suitable for accomplishing various of these objects comprises a floating vessel having a deck that defines a substantially straight path along which a submergible elongate structure is movable relative to the deck, the path including an assembly region in which additional submergible elongate structure can be assembled from components. The movement and positioning of vessel is controlled by deck mounted winches connected to fixed anchors by steel cables. First and second tensioning means are connected to the deck and are selectively connectable to the submergible elongate structure for applying and/or assist in maintaining an axial tension on the submergible elongate structure. The first tensioning means applies such a tension while the floating vessel is being advanced along a desired laying route. That first tensioning means includes a winch mounted on the deck of the vessel, a connector for engaging an end of the submergible elongate structure, and a cable system linking the connector to the winch, the cable system disposed such that the connector is movable along the path substantially throughout the entire length of the assembly region. The second cable tensioning means is selectively connectable to the submergible elongate structure at a location, along that path, that is downstream of the assembly region. With this arrangement, the first cable tensioning means enables payout, under tension, of the assembled submergible elongate structure, while the second cable tensioning means, with the assistance of the barge anchor winches, enables the maintenance of tension on existing submergible elongate structure while additional such structure is being assembled in the assembly region.

In preferred embodiments and methods of the invention the connector of the first tensioning means comprise a plug which can be welded to the free end of pipeline comprising the submergible elongate structure. The cable extends around sheaves from the winch to the connector. The sheave adjacent the assembly region is connected to a load cell, whereby the force transmitted by the tensioning means to the pipeline can be assessed. Also in the preferred apparatus, the second tensioning means comprise a clamp unit having at least one movable jaw, the unit being connected to the deck through a second load cell in order to assess the force exerted on the pipeline through the clamp unit by the barge anchor winches. Preferably, the clamp unit is supported for limited movement with respect to the deck, thereby preventing major changes in the tension exerted in the pipeline by clamp unit even though the vessel makes slight local movement with respect to the bed of the body of water, in response to environmental factors (e.g., wind or waves).

THE DRAWINGS

Other objects, features, and advantages of the present invention will become apparent from the following detailed description of a particular preferred embodiment taken in conjunction with the accompanying drawings in which.

DETAILED DESCRIPTION OF A PARTICULAR PREFERRED EMBODIMENT

Figure 1:
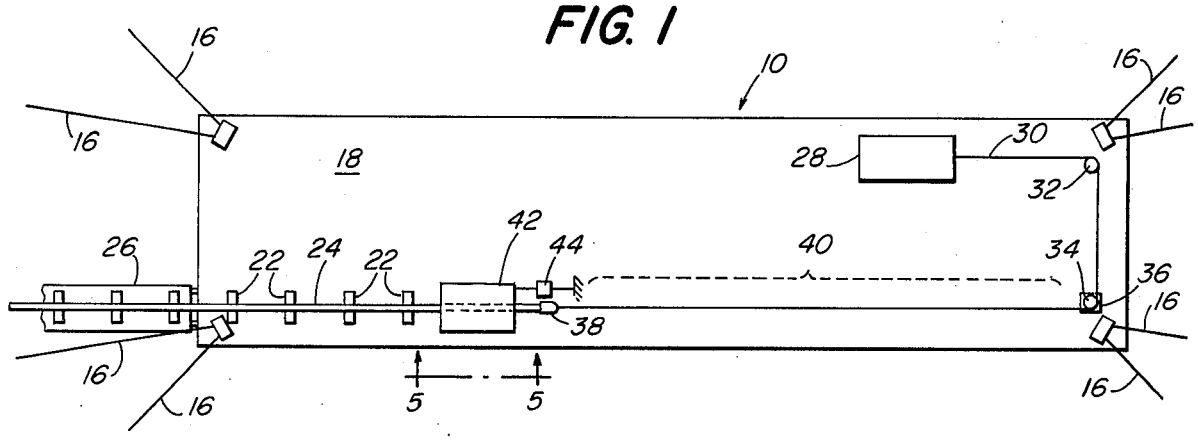
FIG. 1 is a schematic plan view of a barge adapted for laying pipeline in accordance with the present invention, showing the pipeline in a first configuration with respect to the barge.

Referring first to FIGS. 1-4 of the drawings, there is shown in schematic form a barge 10 floating on the surface 12 of a body of water 14 and maintained in a position over the laying route on the bed of the body of water by a series of fore and aft anchor lines 16. The barge 10 has a generally planar deck 18 and, optionally, a downwardly sloping ramp portion 20 at the stern of the barge adjacent one side. A series of roller units or "shoes" 22 support the pipeline 24 along the ramp portion 20. A partially submerged pipeline support unit 26 is secured to the stern of the barge and can be of any conventional design suitable to support the pipeline 24 in a manner to aid is preventing buckling of the pipeline under its own weight during the laying operation. Such units 26 are commonly bouyant and are referred to as "stingers." Examples of suitable stinger constructions may be found in Jones et al. U.S. Pat. No. 3,668,878, Rochelle et al. U.S. Pat. No. 3,775,987 and Rochelle et al. U.S. Pat. No. Re. 27,420, each of which is owned by the assignee of the present invention.

Figure 3:
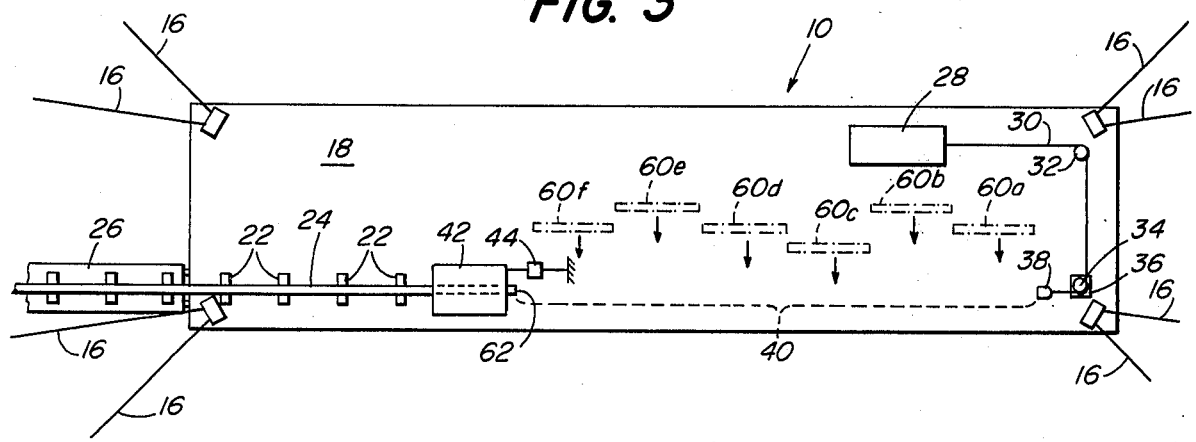
FIG. 3 is a plan view similar to FIG. 1 showing a subsequent stage in the laying of pipeline using the barge of FIG. 1.

A barge winch 28 is secured to the deck 18 and is arranged to take-up or pay-out a flexible cable 30. The cable 30 is entrained about a pair of sheaves 32, 34, the latter secured to the deck 18 through a load cell 36. The free end of cable 30 is secured to a "bull plug" 38, which is attachable, as described below, to the pipeline 24. The sheave 34 is aligned with the pipeline support units 22, a reference line between these elements defining a path of the pipeline 24 with respect to the barge deck 18. A major fraction of the length of the barge intermediate the support units 22 and sheave 34 is defined as an assembly region 40 of the pipeline path. In one preferred embodiment, the region 40 has a length of approximately 240 feet; i.e., the length of six conventional, 40 foot long pipe "joints." Intermediate the region 40 and the support units 22, a clamping unit 42 is provided along the pipeline path. The unit 42, as indicated schematically in FIGS. 1 and 3, is connected to the deck 18 through a load cell 44 (also illustrated schematically). Relative to the path of the pipeline 24, it will be evident that the clamping unit 42 is immediately downstream of the assembly region 40.

Figure 5:
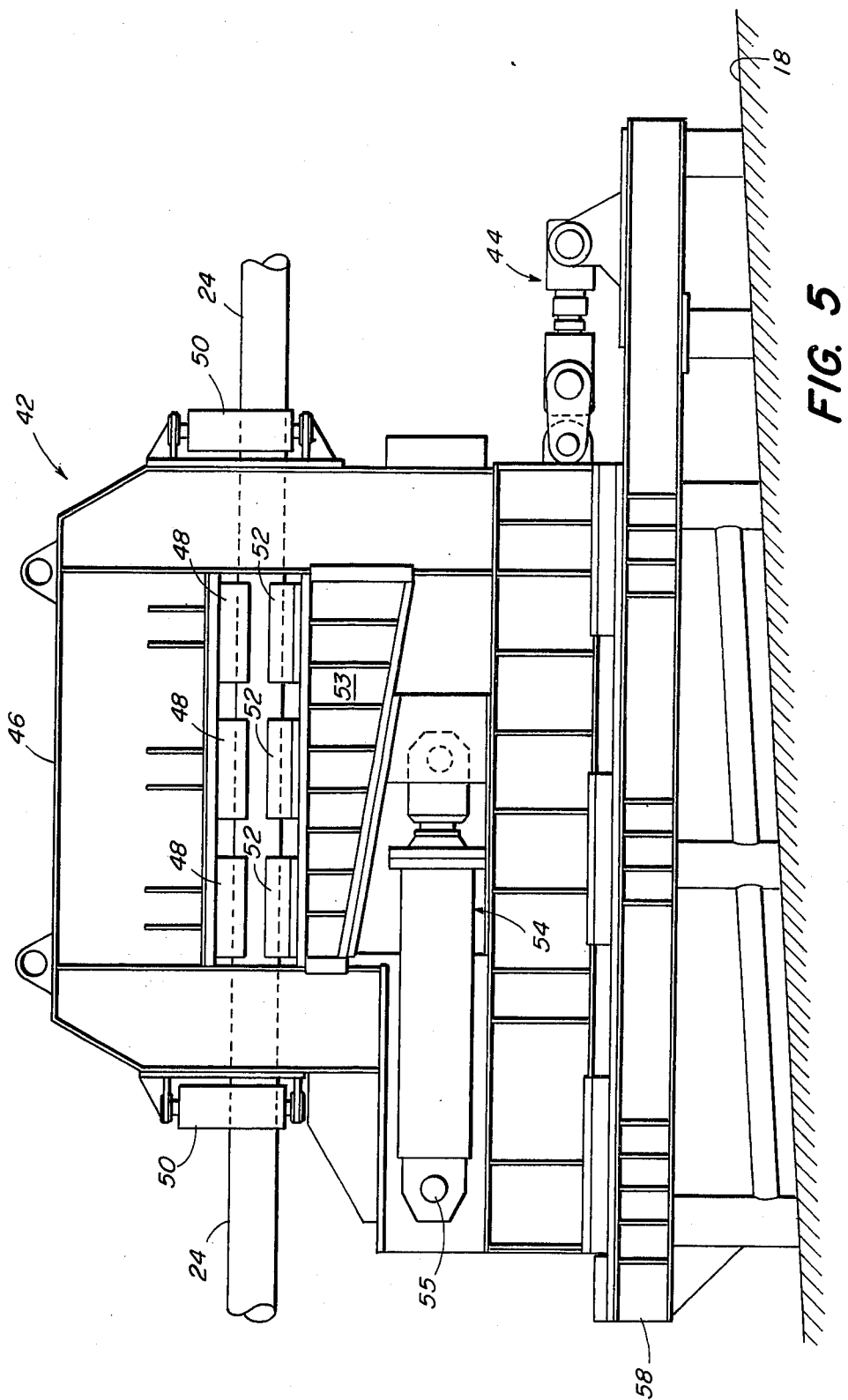
FIG. 5 is a view taken at 5—5 of FIG. 1 illustrating details of a clamping unit in accordance with the present invention.

The structure of the clamp unit 42 may be described with reference to FIG. 5. A frame 46 supports both fixed clamp jaws 48, which may include a Neoprene pad on the surface disposed for engagement with the pipeline segment 24, and a Neoprene covered guide rollers 50. Movable jaws 52 mounted on a wedge 53, are driven by a piston and cylinder system 54 secured at 55 to the frame 46. The frame 46 rests upon rails 58 that are secured to the deck 18.

Figure 2:
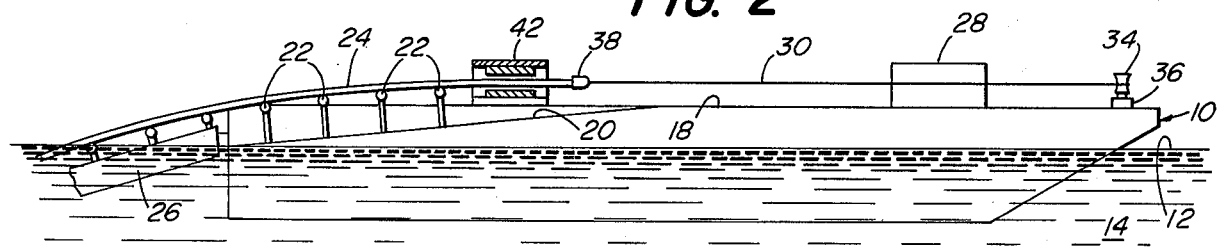
FIG. 2 is a side elevation of the barge illustrated in FIG. 1.

The operation of the apparatus for laying pipeline, as well as the steps of the pipeline laying method, may be described with reference to the sequence of operations illustrated in FIGS. 1-4. Referring first to FIGS. 1 and 2, it will be seen that the bull plug 38, secured to the free end of the pipeline 24, applies an axial tension, produced by the winch 28, to the pipeline 24. The force exerted can be adjusted to maintain a constant reading at load cell 36, thereby assuring a generally constant tension on the pipeline being laid, as is desirable. With the system in this configuration, the clamp unit 42 may be actuated and the bull plug 38 then cut from the free end of the pipeline 38 (see FIG. 3). In this configuration, the tension is supplied by the barge anchor winches, and the clamp unit 42 applies the axial tension to the pipeline 24 and the force may be determined with the load cell 44.

Figure 4:
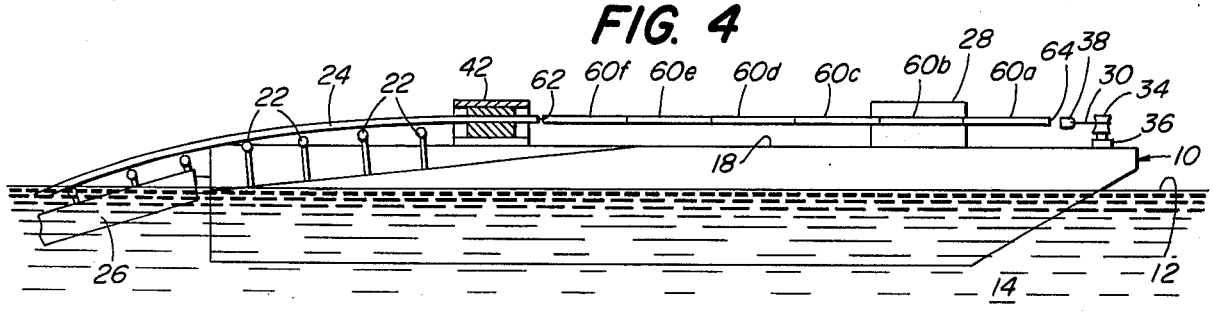
FIG. 4 is a view similar to FIG. 2 showing yet a further stage in the laying of pipeline using the barge of FIG. 1.

With the assembly area 40 on the barge not unobstructed, a new "installment" of pipeline, substantially the length of the assembly region 40, may be assembled. For example, as shown in FIGS. 3 and 4, a series of six 40 foot lengths of pipe, 60a–60f may be moved from a storage location on the barge 10 to locations in alignment with the existing pipeline 24, which rests on support units 22 and is anchored by the clamp unit 42. The pipeline segments are then welded together; typically, welding 60b to 60a, simultaneously welding 60c to 60b, etc. The resulting 240 foot installment of pipeline is then welded to the end 62 of the existing pipeline 24 adjacent the clamping unit 42. The bull plug 38 is then secured to the free end 64 of the extended pipeline, the winch line 30 is attached to the bull plug 38 and the required tension is applied to the pipeline with winch 28. The clamp unit 42 disengaged from the pipeline. With the winch 28 now applying the axial tension to the pipeline 24, the barge 10 may be advanced along the pipeline laying route by taking in bow and paying out stern lengths of anchoring line 16 in a conventional manner. Cable 30 is simultaneously paid out from the winch 28 in order to permit the movement of the pipeline 24 with respect to the barge and to maintain a relatively constant axial tension, which can be monitored by the load cell 36. When the barge had been moved 240 feet, the configuration will be as illustrated in FIG. 1. The clamp 42 can then be actuated, and the required tension is then applied with the barge anchor winches being monitored by load cell 44. The bull plug 38 is cutoff and the free end of the pipeline is ready to be welded to a new "installment," and the entire process repeated.

SUMMARY OF THE MAJOR ADVANTAGES AND SCOPE OF THE INVENTION

The method and apparatus as described provide a convenient and efficient technique of laying pipeline when more sophisticated equipment is not conveniently available. As will be evident to those skilled in the art, the only special equipment, not found on conventional barges, which may be required is the clamp unit. One example of a clamp unit is illustrated in Jones et al. U.S. Pat. No. 3,668,878 issued June 13, 1972, owned by the assignee of the present invention and incorporated herein by reference. But the clamp unit is, of course, a relatively simple device and one which can be simply modified (as by installing different sizes of clamping jaws) to accommodate pipeline of virtually any diameter.

With the interrelationship of the two tensioning systems (i.e., the clamp unit and the winch-bull plug system) as described, a relatively constant tension can be maintained on the pipeline during all stages of pipeline assembly and payout. A single advance of the barge along the laying route is sufficient to payout the entire length of new pipeline that has been assembled in the assembly region on the barge.

Although the invention has been described in connection with preferred embodiments and methods, it will be appreciated by those skilled in the art that additions, deletions, modifications, substitutions, and other changes not specifically described, may be made which fall within the scope of the appended claims.

I claim:

1. Apparatus for laying a submergible elongate structure upon a bed of a body of water comprising:
   a floating vessel having a deck defining a path along which a submergible elongate structure is movable relative to said deck, said path including an assembly region in which additional submergible elongate structure can be assembled from components;
   first tensioning means connected to said deck and selectively connectable to a submergible elongate structure to be laid for applying an axial tension to the submergible elongate structure while said floating vessel is being advanced along a desired laying route, said first tensioning means including
      a winch mounted on the deck of said floating vessel,
      a connector for engaging an end of said submergible elongate structure,
      a cable system linking said connector to said winch, said cable system disposed such that said connector is movable along said path substantially throughout the entire length of said assembly region;
   second tensioning means including a clamp connected to said deck and selectively connectable to the submergible elongate structure at location along said path downstream of said assembly region and a barge anchor winch system for moving said barge;
   whereby said first tensioning means enable payout under tension of assembled submergible elongate structure and said second tensioning means enable the maintenance of tension on existing submergible elongate structure while additional such structure is being assembled in said assembly region.

2. The apparatus of claim 1 wherein said connector comprises a plug securable of the free end of said submergible elongate structure.

3. The apparatus of claim 2 wherein said plug is securable to said submergible elongate structure by welding.

4. The apparatus of claim 1 further including first and second load cells disposed to measure the axial forces exerted on said submergible elongate structure by, respectively, said first and second tensioning means.

5. The apparatus of claim 1 wherein said second tensioning means comprise a clamp unit having at least two jaws, at least one of which is movable, said submergible elongate structure passing between said jaws.

6. The apparatus of claim 5 wherein said movable jaw is driven by a hydraulic piston.

7. A method of laying a submergible elongate structure along a laying route upon the bed of a body of water comprising the steps of
   supporting the terminal portion of the submergible elongate structure upon a floating vessel having a deck that defines a path along which a submergible elongate structure is movable relative to the deck, said path including an assembly region in which additional submergible elongate structure can be assembled from components,
   clamping the submergible elongate structure with a clamping assembly situated downstream of said assembly region,
   assembling additional submergible elongate structure in said assembly region and securing it to the previously existing submergible elongate structure,
   gripping the free end of said additional submergible elongate structure with a connector connected, through a flexible cable under tension, to a winch,
   disengaging said clamping assembly from said submergible elongate structure,
   simultaneously moving said floating vessel along said laying route and paying out flexible cable from said winch,
   clamping the submergible elongate structure with a clamping assembly situated downstream of said assembly region, and
   disengaging said connector from the submergible elongate structure.

8. The method of claim 7 wherein step of gripping the free end of said additional submergible elongate structure with a connector comprises welding an end plug to said free end; said step of disengaging said connector from the submergible elongate structure comprising cutting said end plug from the submergible elongate structure.

9. The method of claim 7 wherein the step of assembling additional submergible elongate structure and of securing it to the previously existing submergible elongate structure comprises welding together in an end-to-end relation segments of said submergible elongate structure to form said additional submergible elongate structure and then welding that additional submergible elongate structure to the previously existing submergible elongate structure.

* * * * *